United States Patent [19]
Li et al.

[11] Patent Number: 5,909,310
[45] Date of Patent: Jun. 1, 1999

[54] OPTICAL CIRCULATOR

[75] Inventors: Wei-Zhong Li, San Jose; Vincent Au-Yeung, Los Altos; Qing-Dong Guo, Sunnyvale, all of Calif.

[73] Assignee: U.S.A Kaifa Technology, Inc., Sunnyvale, Calif.

[21] Appl. No.: 08/986,064

[22] Filed: Dec. 8, 1997

[51] Int. Cl.$^6$ .................................................. G02B 5/30
[52] U.S. Cl. ...................... 359/484; 359/494; 359/495
[58] Field of Search .................................. 359/483, 484, 359/494, 495, 496, 497; 372/703

[56] References Cited

U.S. PATENT DOCUMENTS

| | | | |
|---|---|---|---|
| 4,978,189 | 12/1990 | Blonder et al. | 385/35 |
| 5,319,483 | 6/1994 | Krasinski et al. | 359/484 |
| 5,408,354 | 4/1995 | Hosokawa | 359/484 |
| 5,471,340 | 11/1995 | Cheng et al. | 385/11 |
| 5,574,596 | 11/1996 | Cheng | 359/484 |
| 5,729,377 | 3/1998 | Bergmann | 359/495 |

FOREIGN PATENT DOCUMENTS

| | | | |
|---|---|---|---|
| 5-323234 | 12/1993 | Japan | 359/496 |

*Primary Examiner*—Cassandra Spyrou
*Assistant Examiner*—John Juba, Jr.
*Attorney, Agent, or Firm*—Lumen Intellectual Property Services

[57] ABSTRACT

An improved optical circulator device transfers light from a first optical fiber to a second optical fiber, and from the second fiber to a third optical fiber. The device comprises reciprocal and non-reciprocal polarization rotators, birefringent beam splitters and combiners, and a birefringent walk-off element. The invention also contains a polarization-dependent light bending device comprising two tapered birefringent plates. The light bending device compensates for an angle between a first light beam emanating from the first fiber and a second light beam exiting through the third fiber. The existence of this angle allows the first and third fibers to be coupled to the light beams using a single lens.

14 Claims, 4 Drawing Sheets

OPTICAL CIRCULATOR

FIELD OF THE INVENTION

This invention relates to non-reciprocal couplings for optical fibers, and in particular, to optical circulators.

BACKGROUND

An optical circulator is a device that has at least three ports for accepting optical fibers. Light that enters the circulator through the first port exits through the second port; light that enters through the second port exits through the third. The optical circulator is an inherently non-reciprocal device, since if light enters through the first port it exits through the second, but if that light is subsequently reflected back into the second port, it does not retrace its path back to the first port, but exits through the third port instead.

Circulators are necessary, for example, to use the same fiber for both receiving and transmitting data. The first port may be connected to a data transmitter, and the second port to a long distance optical fiber. In that case, data can be sent from the transmitter to the fiber. At the same time, incoming optical data from the long distance fiber enters the circulator through the second port and is directed to the third port where a receiver may be connected.

One prior art optical circulator is described in U.S. Pat. No. 4,650,289 by Kuwahara; see FIG. 1. In this circulator, the labels A, B, and C correspond to the first, second, and third ports described above (port D need not be used). This circulator suffers from the following disadvantages: it requires two spatially separated optical paths, and the ports A and C are perpendicular. This means that the circulator will be bulky when a more compact size is desirable.

A more compact circulator is described in U.S. Pat. No. 5,204,771 by Koga; see FIG. 2. This circulator shows an improvement over the previous one since the two optical paths can be in close proximity, and the first and third ports (designated 27 and 28 in the drawing) are parallel. Unfortunately, this device still suffers from a disadvantage. A lens must be placed between the first optical fiber and the circulator to collimate light coming from the first fiber. A lens must also be placed between the third fiber and the circulator to focus light onto the third fiber. If the first and third fibers are far enough apart that there is room to insert two lenses side by side (one for each fiber), the circulator will have to be quite large. Such a circulator will also be expensive, since the cost increases with the size of the components.

If the first and third ports (27 and 28 in FIG. 2) are very close together, the first and third fibers will have to share a common lens for collimating and focusing. However, it is impossible for a single lens to perform adequately for both fibers. The difficulty can be traced to the fact that the light beams coupled to the first and third ports are parallel, and a single lens cannot focus two parallel beams to two different points (i.e., to two different fibers). This prior art therefore suffers from the shortcoming that it cannot be manufactured economically when the circulator is large, and it cannot be efficiently coupled to optical fibers when the circulator is small.

OBJECTS AND SUMMARY OF THE INVENTION

In view of the above, it is an object of the present invention to provide a compact and economical optical circulator that can be efficiently coupled to optical fibers.

The invention consists of an optical circulator having at least three ports for optical fibers. Light beams coupled to the first and third fibers are not parallel; there is a slight angle between the two beams. Because of this angle, a single lens may be used for coupling both the first and the third fibers to the circulator.

The invention further consists of a light-bending device comprising two tapered birefringent plates, situated to compensate for the angle between the light beams coupled to the first and third fibers.

DETAILED DESCRIPTION OF THE INVENTION

Figure 1:
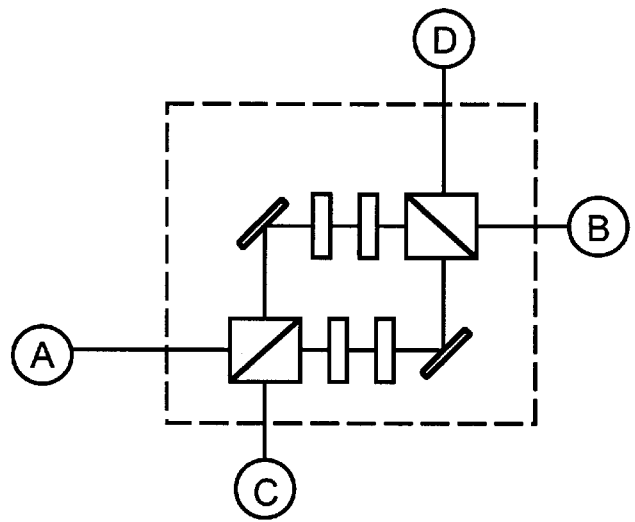
FIG. 1 shows a prior art optical circulator by Kuwahara.
Figure 2:
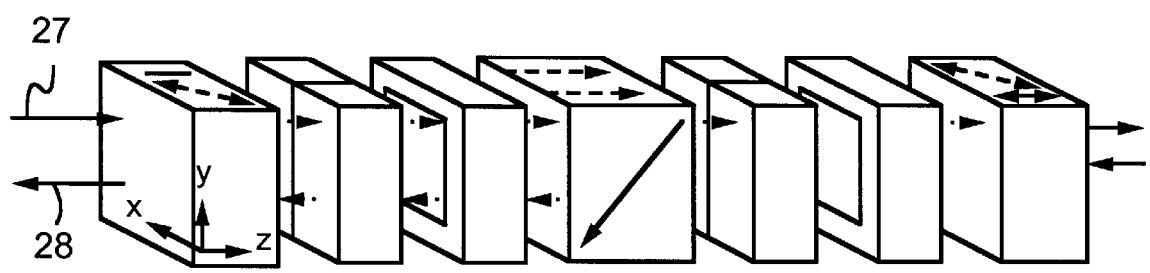
FIG. 2 shows a prior art optical circulator by Koga.
Figure 3:
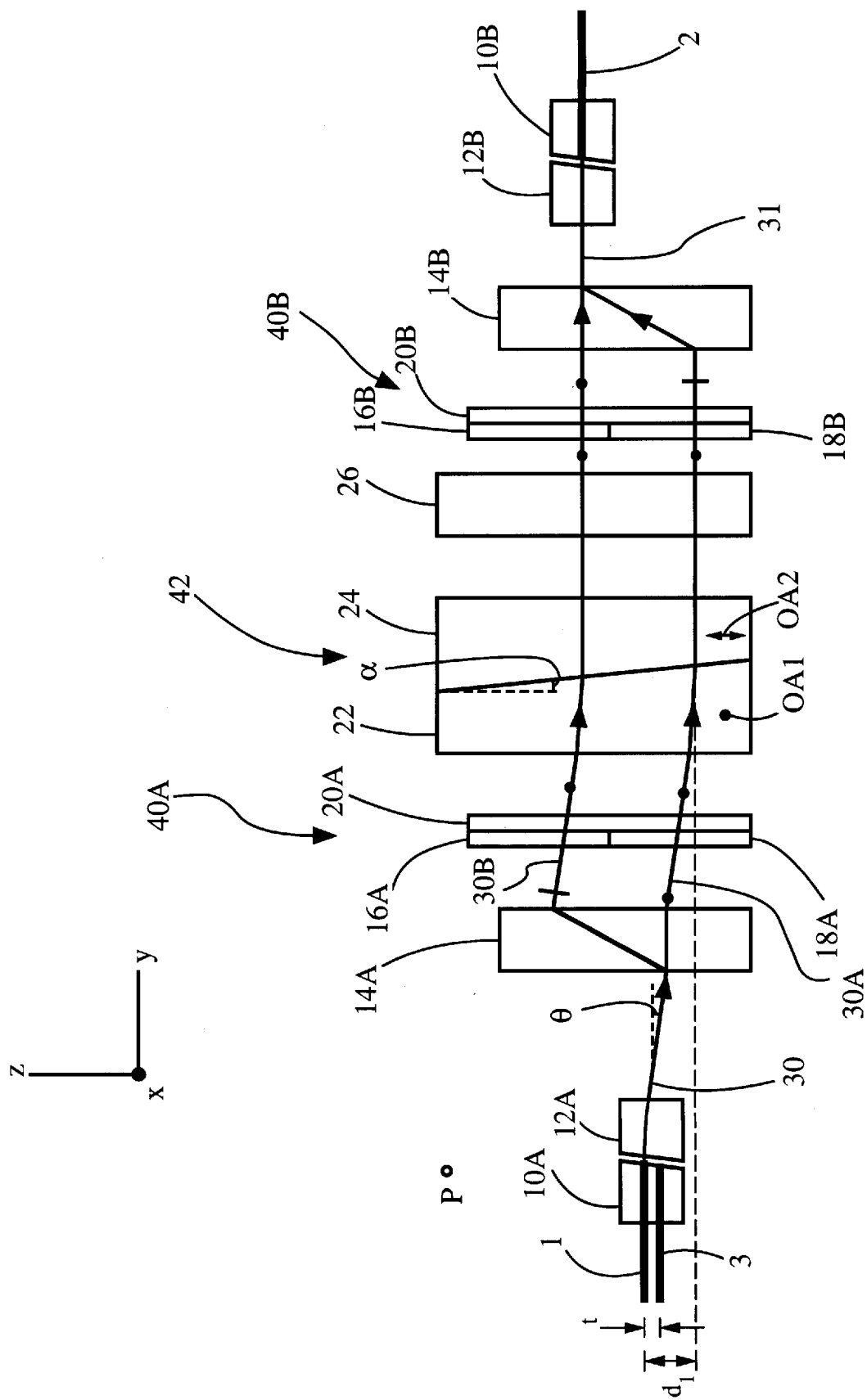
FIG. 3 shows how light is transmitted from the first optical fiber to the second optical fiber in the preferred embodiment of the invention.

FIG. 3 shows the preferred embodiment of the invention. A first optical fiber 1 is inserted into a first glass tube 10A. A second optical fiber 2 is inserted into a second glass tube 10B opposite first fiber 1. A third optical fiber 3 is inserted into first glass tube 10A adjacent to fiber 1, so that fiber 3 and fiber 1 are parallel.

A set of orthogonal reference axes can be arranged so that the y-axis is parallel to fibers 1, 2, and 3. A reference point P is located near the first glass tube 10A.

Fiber 1 emits a light beam 30 that is collimated by a first lens 12A. Lens 12A also causes beam 30 to make an angle $\theta$ with respect to the y-axis. In the preferred embodiment, lens 12A is a graded index (GRIN) lens.

Beam 30 then passes through a first birefringent block 14A. Beam 30 is thereby divided into two beams having orthogonal polarizations, beams 30A and 30B, corresponding to the ordinary and extraordinary rays in birefringent block 14A. Beam 30A is polarized along the x-axis (out of the page); this polarization is indicated by a dot in FIG. 3. Beam 30B is polarized in the y-z plane; this polarization is indicated by a line segment.

Beam 30A now enters a first half wave plate 18A which rotates the plane of polarization by 45° in the counter-clockwise direction as seen from the point P in FIG. 3. Beam 30A then enters a first Faraday rotator 20A which rotates the plane of polarization by 45° in the clockwise direction as seen from point P. The net effect of half wave plate 18A and Faraday rotator 20A (the first a reciprocal device, the second non-reciprocal), therefore, is to leave the polarization of beam 30A unaltered.

Beam 30B, meanwhile, enters a second half wave plate 16A which rotates the plane of polarization 45° clockwise as seen from P; i.e., half wave plate 16A effects a rotation in the opposite direction to half wave plate 18A. Beam 30B then passes through Faraday rotator 20A, which again rotates the plane of polarization by 45° clockwise as seen from P. Therefore, after passing through half wave plate 16A and Faraday rotator 20A, the polarization of beam 30B is in the x-direction, parallel to the polarization of beam 30A.

Half wave plates 16A and 18A, together with Faraday rotator 20A, comprise a first compound polarization rotator 40A that renders two orthogonal polarizations parallel.

Beams 30A and 30B still propagate at an angle θ with respect to the y-axis as they exit rotator 20A. This angle of propagation is changed by a polarization-dependent light guiding device 42. Device 42 comprises a first tapered birefringent plate 22 and a second tapered birefringent plate 24. The tapering of plate 22 is complementary to the tapering of plate 24, and each plate is tapered by an angle α. Plates 22 and 24 are made from the same birefringent material; each plate has two indices of refraction, $n_e$ and $n_o$, corresponding to extraordinary and ordinary rays. In the embodiment shown in FIG. 3, $n_o > n_e$.

The index of refraction in general determines how much a light ray will bend, or refract, upon entering a material. When the index of refraction is known, the amount of refraction can be determined by an equation known as Snell's law. A birefringent material has two indices of refraction, indicating that different polarizations of light will refract different amounts.

Plate 22 has an optic axis OA1 that is oriented parallel to the x-axis. Therefore beams 30A and 30B are extraordinary rays in plate 22, and are refracted according to an index of refraction $n_e$. Plate 24 has an optic axis OA2 that is parallel to the z-axis, so beams 30A and 30B are ordinary rays within plate 24. Therefore beams 30A and 30B are refracted upon passing from plate 22 to plate 24 because of the difference between indices of refraction $n_e$ and $n_o$.

The angle α is adjusted so that beams 30A and 30B are made parallel to the y-axis by light guiding device 42. Using Snell's law at each interface, it can be shown that the relationship between the angles α and θ is:

$$\sin \theta = n_e \sin\{\sin^{-1}[(n_o/n_e)\sin \alpha] - \alpha\} \quad (1)$$

Beams 30A and 30B exit plate 24 and enter a second birefringent block 26. Beams 30A and 30B are ordinary rays in block 26 and are undeflected.

Beam 30A next enters a half wave plate 18B which rotates the plane of polarization by 45° counterclockwise as seen from point P. Beam 30A then passes through a Faraday rotator 20B which rotates the polarization by another 45° counterclockwise as seen from P. Beam 30A is now polarized in the z-direction (indicated by a line segment in the figure).

Meanwhile, beam 30B passes through a half wave plate 16B which rotates the polarization 45° clockwise as seen from P. Beam 30B then enters Faraday rotator 20B which rotates the plane of polarization by 45° counterclockwise as seen from P. Therefore, half wave plate 16B and rotator 20B together have no net effect on the polarization of beam 30B.

Half wave plates 16B and 18B and Faraday rotator 20B together comprise a second compound polarization rotator 40B that renders two parallel polarizations perpendicular.

Beams 30A and 30B subsequently pass through a third birefringent block 14B, where beam 30A is the extraordinary ray and beam 30B is ordinary. Block 14B combines beams 30A and 30B to form a single beam 31 that is in general unpolarized.

Beam 31 is focused by a second lens 12B (preferably a GRIN lens) and enters optical fiber 2 mounted in glass tube 10B.

Figure 4:
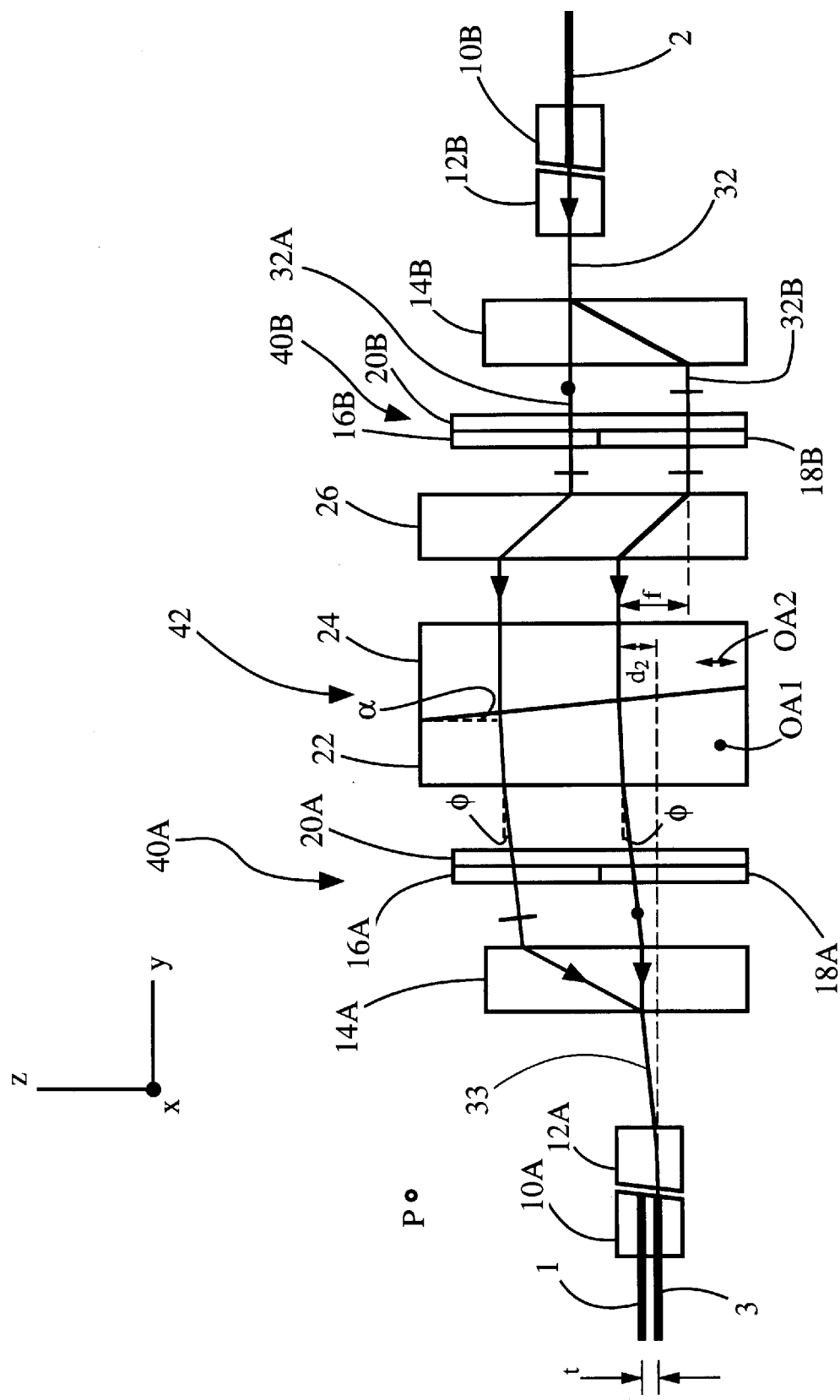
FIG. 4 shows how light is transmitted from the second optical fiber to the third optical fiber in the preferred embodiment of the invention.

The description so far shows how light starting from fiber 1 is guided into fiber 2. For the circulator to work, light entering the circulator from fiber 2 must be channeled into fiber 3. This is shown in FIG. 4.

A beam 32 exits fiber 2 and is collimated by lens 12B. Beam 32 then enters birefringent block 14B and is split into two beams, 32A and 32B, having orthogonal polarizations. Beam 32A is ordinary, beam 32B extraordinary in block 14B. Upon leaving block 14B, beam 32A is polarized in the x-direction and beam 32B is polarized in the y-direction, as indicated in FIG. 4.

Beams 32A and 32B next enter compound polarization rotator 40B. Beam 32A enters Faraday rotator 20B, which rotates the polarization by 45° counterclockwise as seen from P. Then beam 32A enters half wave plate 16B, which rotates the polarization by another 45° counterclockwise as seen from P.

Meanwhile the polarization of beam 32B is rotated by 45° counterclockwise as seen from P by Faraday rotator 20B. The polarization of beam 32B is then rotated back 45° clockwise as seen from P by half wave plate 18B.

Therefore, just before beams 32A and 32B enter birefringent block 26, they are both polarized in the z-direction. Here the non-reciprocal nature of the circulator is already clear, since if beams 32A and 32B were to exactly retrace the paths of beams 30A and 30B (FIG. 3), they should be polarized in the x-direction. The origin of the non-reciprocity is the Faraday rotator 20B.

Beams 32A and 32B enter birefringent block 26, where they are extraordinary rays and are offset by a distance f. The beams then enter light guiding device 42, which causes beams 32A and 32B to each make an angle φ with respect to the y-axis.

Beams 32A and 32B first enter birefringent plate 24. The optic axis OA2 of plate 24 is parallel to the polarizations of beams 32A and 32B. Beams 32A and 32B are therefore extraordinary rays, but are undeflected since they are normally incident upon plate 24. Upon leaving plate 24 and entering plate 22, however, beams 32A and 32B become ordinary rays, since their polarizations are perpendicular to the optic axis OA1 of plate 22. Beams 32A and 32B therefore refract upon entering plate 22 due to the difference between $n_e$ and $n_o$. When beams 32A and 32B exit plate 22, they refract again to make an angle φ with respect to the y-axis. Using Snell's law, one can derive the following relationship between angle φ and angle α:

$$\sin \phi = n_o \sin\{\alpha - \sin^{-1}[(n_e/n_o)\sin \alpha]\} \quad (2)$$

After leaving light guiding device 42, beam 32A then passes through Faraday rotator 20A and half wave plate 16A with no net effect on its polarization. Beam 32B passes through Faraday rotator 20A and half wave plate 18A; the result is to rotate the polarization of beam 32A by 90° clockwise as seen from P. Beams 32A and 32B now have orthogonal polarizations, and are combined into a single beam 33 by birefringent block 14A. Beam 33 is subsequently focused by lens 12A onto fiber 3.

Birefringent block 26 plays an important role in guiding light from fiber 2 to fiber 3. Since light guiding device 42 bends beams 32A and 32B by the angle φ, beams 32A and 32B travel laterally (in the negative z-direction) as well as longitudinally (in the negative y-direction) after they leave device 42. This lateral travel must be compensated by block 26.

To be more precise, beams 32A and 32B are offset a distance d by birefringent block 26. The distance along the z-axis between the point where beam 32B enters plate 24 and fiber 3 is $d_2$ (see FIG. 4). The distance along the z-axis between fiber 1 and the point where beam 30A leaves plate 24 is $d_1$ (see FIG. 3). The distance between fiber 1 and fiber 3 is t. The relation between these quantities is:

$$f = d_1 + d_2 - t \quad (3)$$

This equation reveals how to design block 26 to have the correct offset f given the other parameters of the apparatus, $d_1$, $d_2$, and t.

In an alternative embodiment, the apparatus is designed in such a way that $d_1 + d_2 = t$. Eq. (3) then implies that f=0, which means that birefringent block 26 can be eliminated completely from the design.

If angle θ were exactly equal to angle φ, fibers 1 and 3 would be placed symmetrically with respect to the center of lens 12A. That is, the lateral distance (distance measured along the z-axis) from fiber 1 to the center of lens 12A would equal the lateral distance from fiber 3 to the center of lens 12A. However, angles θ and φ are only approximately equal: if angles θ, φ, and α are all small, Eqs. (1) and (2) yield to a first approximation $$\theta \approx (n_o - n_e)\alpha \approx \phi$$

To a better approximation, angle θ differs slightly from angle φ. This difference can be accommodated in at least two ways. The first option is to adjust the lateral positions (i.e. z-coordinates) of fibers 1 and 3 so that the fibers are asymmetric with respect to the center of lens 12A. The second, preferred option is to place fibers 1 and 3 symmetrically with respect to the center of lens 12A, and to rotate light guiding device 42 slightly about an axis parallel to the x-axis, thereby altering equations (1) and (2) to ensure that θ=φ. Either approach represents a minor adjustment of the overall apparatus. In practice, angles φ and θ are between 1° and 3°, and light guiding device 42 is rotated a fraction of a degree. Birefringent elements 14A, 14B, 22, 24, and 26 can be made of any birefringent material, such as rutile, calcite, or yttrium orthovanadate.

It should be clear that several variations of the above embodiment are possible and remain within the scope of the invention. For example, the polarizations of beams 30A and 30B need not be exactly as shown. It is only important that the polarizations of 30A and 30B are perpendicular to each other when the beams exit block 14A, and that the polarizations are parallel after leaving rotator 20A. If the polarizations of beams 30A and 30B are not as described above, the optic axes of the birefringent elements 14A, 14B, 22, 24, and 26 can be adjusted accordingly. This adjustment will also change the polarizations of beams 32A and 32B. However, the basic principles of the circulator would remain unchanged.

In another embodiment, beam 30A is extraordinary and beam 30B is ordinary in block 14A. In this embodiment, the beams have complementary properties in block 14B: beam 30A is ordinary and beam 30B is extraordinary. This arrangement ensures, as does the primary embodiment, that beams 30A and 30B both traverse approximately the same optical path, and therefore the phase relation between them is maintained by the circulator.

Figure 5A:
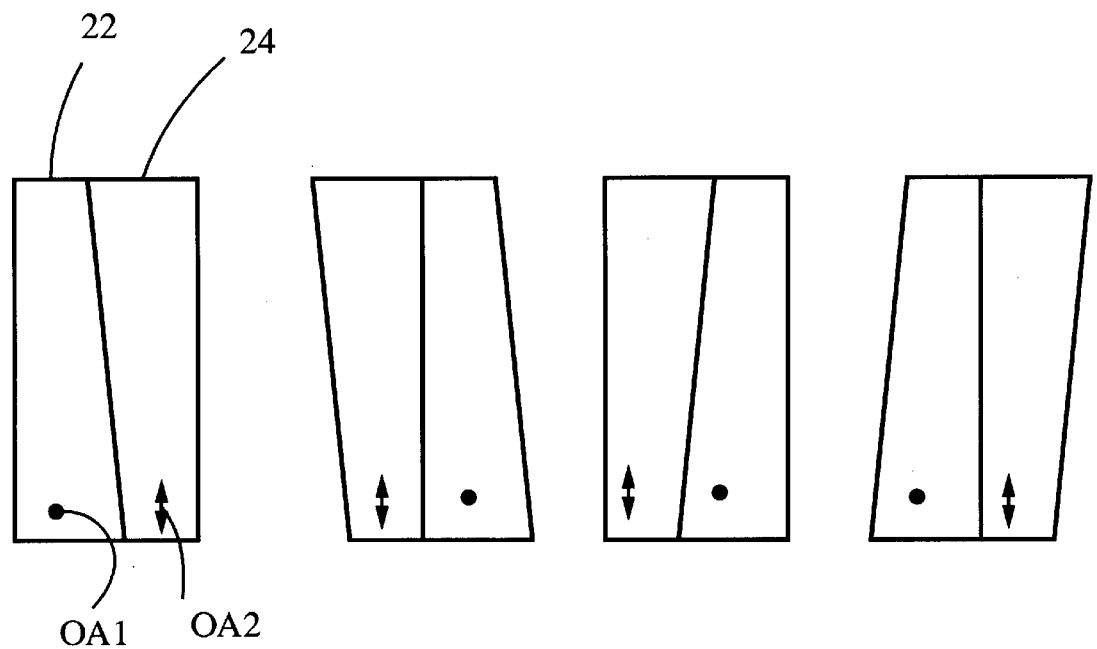
FIG. 5a shows various embodiments of polarization-dependent light guiding device 42 when $n_o > n_e$.
Figure 5B:
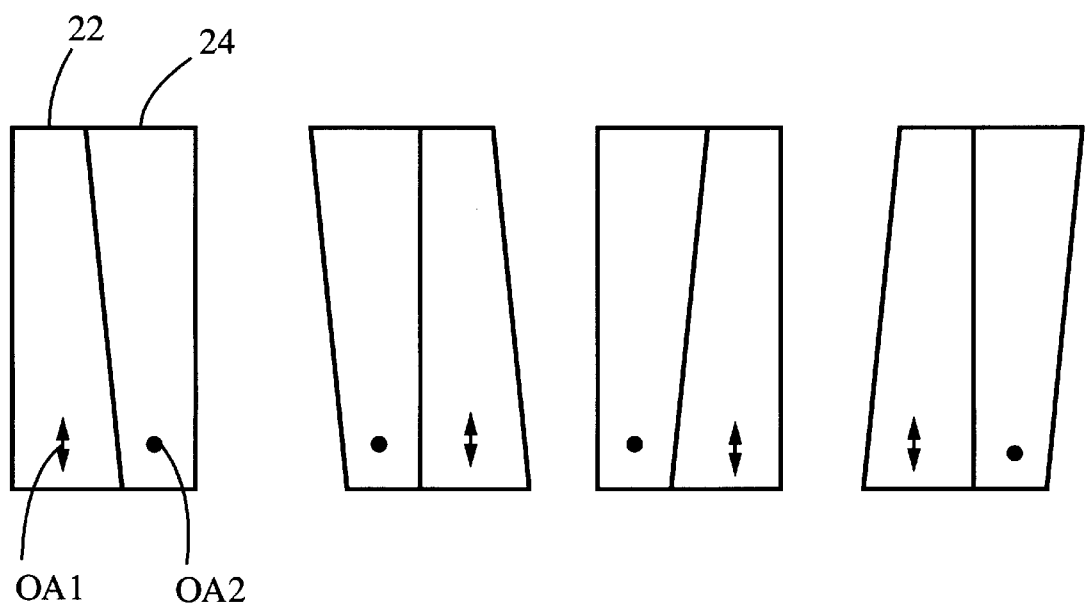
FIG. 5b shows various embodiments of polarization-dependent light guiding device 42 when $n_o < n_e$.

Variations of light guiding device 42 are also possible. FIG. 5a shows different shapes and orientations of optic axes OA1 and OA2 that plates 22 and 24 can have when $n_o > n_e$. If plates 22 and 24 are made of some birefringent material with $n_o < n_e$, other geometries could be used, as shown in FIG. 5b. Still other variations are possible: in the examples of FIG. 5a and FIG. 5b, plates 22 and 24 each have one face parallel to the z-axis. However, a more general trapezoidal shape could be used for either or both of plates 22 and 24, with no faces parallel to the z-axis. Furthermore, plate 22 need not be made of the same material as plate 24.

Accordingly, the scope of the invention should be determined by the following claims and their legal equivalents.

We claim:

1. An optical circulator device for coupling first, second, and third optical fibers, the device comprising:
   a longitudinal axis, along which are sequentially situated:
   a) a first lens,
   b) a first block of birefringent material,
   c) a first compound polarization rotator for rendering two parallel polarizations perpendicular and two perpendicular polarizations parallel to each other;
   d) a polarization-dependent light guiding device, comprising first and second tapered plates of birefringent material, the first plate having a first optic axis, the second plate having a second optic axis, said first optic axis being perpendicular to said second optic axis;
   e) a polarization-dependent beam path deflector comprising a second block of birefringent material,
   f) a second compound polarization rotator for rendering two parallel polarizations perpendicular and two perpendicular polarizations parallel to each other;
   g) a third block of birefringent material,
   h) a second lens;
   wherein
   a first light beam emanating from said first fiber passes through said first lens; said first beam exits said first lens at an angle θ with respect to said longitudinal axis; said first beam is divided into a second beam and a third beam by said first birefringent block; said second and third beams are made parallel with said longitudinal axis by said light guiding device; said second and third beams are combined into a fourth beam by said third birefringent block, and said fourth beam is focused by said second lens into said second fiber;
   and wherein
   a fifth beam emanating from said second fiber is parallel with said longitudinal axis; said fifth beam is divided into a sixth beam and a seventh beam by said third block of birefringent material; said sixth and seventh beams are laterally offset by said beam path deflector; said sixth and seventh beams are bent by said light guiding device to make an angle φ with respect to said longitudinal axis; said sixth and seventh beams are combined to form an eighth beam by said first birefringent block, and said eighth beam is focused by said first lens into said third fiber;
   whereby said circulator device transmits light from the first fiber to the second fiber, and from the second fiber to the third fiber.

2. The device of claim 1 wherein said first and second lenses are graded index lenses.

3. The device of claim 1 wherein said angle θ is between 1° and 3°, and said angle φ is between 1° and 3°.

4. The device of claim 1 wherein said polarization-dependent light guiding device is rotated to ensure that said angle φ is substantially equal to said angle θ.

5. The device of claim 1 wherein said first fiber is adjacent and parallel to said third fiber.

6. The device of claim 1 wherein said first, second, and third blocks of birefringent material and said first and second tapered plates comprise a material selected from the group consisting of rutile, calcite, and yttrium orthovanadate.

7. The device of claim 1 wherein said first compound polarization rotator comprises first and second reciprocal polarization rotators and a first non-reciprocal polarization rotator; and said second compound polarization rotator comprises third and fourth reciprocal polarization rotators and a second non-reciprocal polarization rotator.

8. The device of claim 1 wherein said second beam is an ordinary beam in said first birefringent block, said sixth beam is an ordinary beam in said first birefringent block, and said beam path deflector laterally offsets said sixth and seventh beams by a distance equal to a lateral distance between said first fiber and a point where said second beam exits said light guiding device plus a lateral distance between said third fiber and a point where said sixth beam enters said light guiding device minus a lateral distance between said first fiber and said third fiber.

9. An improved optical circulator device for coupling first, second, and third optical fibers, the device of the type comprising:

a longitudinal axis, along which are sequentially situated:
 a) a first lens,
 b) a first beam splitter and combiner comprising a first block of birefringent material,
 c) a first compound polarization rotator comprising first and second reciprocal polarization rotators and a first non-reciprocal polarization rotator,
 d) a polarization-dependent beam path deflector comprising a second block of birefringent material,
 e) a second compound polarization rotator comprising third and fourth reciprocal polarization rotators and a second non-reciprocal polarization rotator,
 f) a second beam splitter and combiner comprising a third block of birefringent material,
 g) a second lens;

wherein the improvement comprises:

a polarization-dependent light guiding device comprising first and second tapered plates of birefringent material, the first plate having a first optic axis, the second plate having a second optic axis, said first optic axis being perpendicular to said second optic axis;

wherein a non-zero angle exists between (i) a first light beam entering said first birefringent block, said first beam having originated from said first fiber, and (ii) a second light beam exiting said first birefringent block, said second beam having originated from said second fiber.

10. The device of claim 9 wherein said first and second lenses are graded index lenses.

11. The device of claim 9 wherein said angle is between 2° and 6°.

12. The device of claim 9 wherein said first fiber is adjacent and parallel to said third fiber.

13. The device of claim 9 wherein said first beam originating from said first fiber passes through said first lens, and said second beam originating from said second fiber passes through said first lens and enters said third fiber.

14. The device of claim 9 wherein said first, second, and third blocks of birefringent material and said first and second tapered plates comprise a material selected from the group consisting of rutile, calcite, and yttrium orthovanadate.

* * * * *